United States Patent
Beer et al.

(10) Patent No.: US 7,203,161 B2
(45) Date of Patent: Apr. 10, 2007

(54) METHOD AND APPARATUS FOR RECOVERY FROM FAULTS IN A LOOP NETWORK

(75) Inventors: Reginald Beer, Eastleigh (GB); Paul Nicholas Cashman, Alton (GB); Paul Hooton, Eastleigh (GB); Ian David Judd, Winchester (GB); Robert Frank Maddock, Christchurch (GB); Robert Bruce Nicholson, Southsea (GB); Barry Douglas Whyte, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1027 days.

(21) Appl. No.: 10/150,578

(22) Filed: May 17, 2002

(65) Prior Publication Data

US 2003/0005368 A1 Jan. 2, 2003

(30) Foreign Application Priority Data

Jun. 29, 2001 (GB) .................................. 0115969.8

(51) Int. Cl.
- H04J 1/16 (2006.01)
- H04J 3/14 (2006.01)
- H04L 1/00 (2006.01)
- H04L 12/28 (2006.01)
- H04L 12/56 (2006.01)

(52) U.S. Cl. .................................................... 370/224
(58) Field of Classification Search ......... 370/222–224
See application file for complete search history.

(56) References Cited

U.S. PATENT DOCUMENTS

| | | | |
|---|---|---|---|
| 3,990,058 A | * 11/1976 | Archer et al. ................. | 365/1 |
| 4,390,984 A | 6/1983 | Sugiura et al. ................ | 370/88 |
| 4,633,468 A | 12/1986 | Skatrud et al. ............... | 371/22 |

(Continued)

FOREIGN PATENT DOCUMENTS

EP 0 494 695 A1 7/1992

(Continued)

OTHER PUBLICATIONS

"Fibre Channel Arbitrated Loop (FC-AL-2) Revision 7.0", American National Standard for Information Technology, Apr. 1, 1999, pp. 1-139.

(Continued)

*Primary Examiner*—Chi Pham
*Assistant Examiner*—Ronald Abelson
(74) *Attorney, Agent, or Firm*—Harrington & Smith, LLP

(57) ABSTRACT

A method and apparatus for recovery from faults in a loop network (500) is provided. The loop network (500) has a plurality of ports (520, 530, 532, 534) serially connected with means for bypassing the ports (520, 530, 532, 534) from the loop network (500). A control device (522, 524) is provided with bypass control over at least one of the ports (530, 532, 534). A host means (502) sends a command to the control device (522, 524) at regular intervals and the control device (522, 524) has a counter which restarts a time period at the receipt of each command. If the time period expires, the control device (522, 524) activates the means for bypassing all the ports (530, 532, 534) under its control. The loop network (500) may have two loops (516, 518) with at least some of the ports (520, 530, 532, 534) common to both loops (516, 518).

8 Claims, 3 Drawing Sheets

U.S. PATENT DOCUMENTS

| | | | |
|---|---|---|---|
| 4,899,142 A * | 2/1990 | Nakayashiki et al. | 370/224 |
| 6,088,141 A * | 7/2000 | Merli et al. | 398/5 |
| 6,347,339 B1 * | 2/2002 | Morris et al. | 709/237 |
| 6,990,066 B1 * | 1/2006 | Buckland et al. | 370/222 |
| 7,016,312 B1 * | 3/2006 | Semaan et al. | 370/254 |
| 2003/0086367 A1 * | 5/2003 | Bengston et al. | 370/216 |
| 2005/0223146 A1 * | 10/2005 | Dellacona | 710/74 |

OTHER PUBLICATIONS

"SCSI-3 Enclosure Services Command Set (SES), Revision 8a", American National Standard for Information Systems, Jan. 16, 1997, pp. 1-76.

* cited by examiner

METHOD AND APPARATUS FOR RECOVERY FROM FAULTS IN A LOOP NETWORK

FIELD OF INVENTION

This invention relates to a method and apparatus for recovery from faults in a loop network. In particular, the invention relates to recovery from faults in Fibre Channel Arbitrated Loops. The invention could equally apply to recovery from faults in other unidirectional loops, for example, Token Ring networks, FDDI (Fibre Data Distributed Interfaces), etc.

BACKGROUND OF THE INVENTION

Fibre Channel Arbitrated Loop (FC-AL) architecture is a member of the Fibre Channel family of ANSI standard protocols. FC-AL is typically used for connecting together computer peripherals, in particular disk drives. The FC-AL architecture is described in NCITS working draft proposals, American National Standard for Information Technology "Fibre Channel Arbitrated Loop (FC-AL-2) Revision 7.0", Apr. 1, 1999 and "Fibre Channel Arbitrated Loop (FC-AL-3) Version 1.0", Sep. 20, 1999.

Electronic data systems can be interconnected using network communication systems. Area-wide networks and channels are two technologies that have been developed for computer network architectures. Area-wide networks (e.g. LANs and WANs) offer flexibility and relatively large distance capabilities. Channels, such as the Small Computer System Interface (SCSI), have been developed for high performance and reliability. Channels typically use dedicated short-distance connections between computers or between computers and peripherals.

Fibre Channel technology has been developed from optical point-to-point communication of two systems or a system and a subsystem. It has evolved to include electronic (non-optical) implementations and has the ability to connect many devices, including disk drives, in a relatively low-cost manner. This addition to the Fibre Channel specifications is called Fibre Channel Arbitrated Loop (FC-AL).

Fibre Channel technology consists of an integrated set of standards that defines new protocols for flexible information transfer using several interconnection topologies. Fibre Channel technology can be used to connect large amounts of disk storage to a server or cluster of servers. Compared to Small Computer Systems Interface (SCSI), Fibre Channel technology supports greater performance, scalability, availability, and distance for attaching storage systems to network servers.

Fibre Channel Arbitrated Loop (FC-AL) is a loop architecture as opposed to a bus architecture like SCSI. FC-AL is a serial interface, where data and control signals pass along a single path rather than moving in parallel across multiple conductors as is the case with SCSI. Serial interfaces have many advantages including: increased reliability due to point-to-point use in communications; dual-porting capability, so data can be transferred over two independent data paths, enhancing speed and reliability; and simplified cabling and increased connectivity which are important in multi-drive environments. As a direct disk attachment interface, FC-AL has greatly enhanced I/O performance.

The operation of FC-AL involves a number of ports connected such that each port's transmitter is connected to the next port's receiver, and so on, forming a loop. Each port's receiver has an elasticity buffer that captures the incoming FC-AL frame or words and is then used to regenerate the FC-AL word as it is re-transmitted. This buffer exists to deal with slight clocking errors that occur. Each port receives a word, and then transmits that word to the next port, unless the port itself is the destination of that word, in which case it is consumed. The nature of FC-AL is therefore such that each intermediate port between the originating port and the destination port gets to 'see' each word as it passes around the FC-AL loop.

FC-AL architecture may be in the form of a single loop. Often two independent loops are used to connect the same components in the form of dual loops. The aim of these loops is that a single fault should not cause both loops to fail simultaneously. However, some faults, for example in a protocol chip or microprocessor in a disk drive which is common to both loops, can cause both loops to fail. More than two loops can also be used.

A FC-AL can incorporated bypass circuits with the aim of making the FC-AL interface sufficiently robust to permit devices to be removed from the loop without interrupting throughput and sacrificing data integrity. If a disk drive fails, port bypass circuits attempt to route around the problem so all disk drives on the loop remain accessible. Without port bypass circuits a fault in any device will break the loop.

In dual loops, port bypass circuits are provided for each loop and these provide additional protection against faults. Most disk drive failures would cause the disk drive to request bypass; however, faults can occur in disk drives that do not request bypass and therefore do not prevent both loops from failing.

A typical FC-AL may have one or two host bus adapters (HBA) and a set of six or so disk drive enclosures or drawers, each of which may contain a set of ten to sixteen disk drives. There is a physical cable connection between each enclosure and the HBA in the FC-AL. Also, there is a connection internal to the enclosure or drawer, between the cable connector and each disk drive in the enclosure or drawer, as well as other components within the enclosure or drawer, e.g. SES device (SCSI Enclosure Services node) or other enclosure services devices.

A SES device is an example of an enclosure service device which manages a disk enclosure and allows the monitoring of power and cooling in an enclosure. The SES device also obtains information as to which slots in an enclosure are occupied. The SES device accepts a limited set of SCSI commands. SCSI Enclosure Services are described in the working draft proposed by the American National Standards for Information Systems "SCSI-3 Enclosure Services Command Set (SES), Revision 8a", 16 Jan. 1997.

It is an aim of the present invention to provide increased reliability, availability and serviceability in a loop network.

DISCLOSURE OF THE INVENTION

According to a first aspect of the present invention there is provided a method for recovery from faults in a loop network, the loop network having a plurality of ports and a control device with bypass control over at least one of the ports, the method including: sending commands at regular intervals to the control device; restarting a time period in the control device at the receipt of a command; and if the time period expires in the control device, instructing the bypass of all ports under control of the control device.

Preferably, there are two loops in the loop network with at least some of the ports common to both loops and one control device on or connected to each loop.

The time period may be at least two times the interval between the commands.

The step of bypassing of all the ports under the control of the control device reactivates the loop or loops with the control device in or connected to the loop or loops. The loop network does not know which device has failed; therefore, bypassing all the ports means there is a high probability that the failed port will be among those bypassed and thus the loop becomes connected again.

The method may include subsequently selectively un-bypassing ports to ascertain the location of the faulty port.

According to a second aspect of the present invention there is provided an apparatus for recovery from faults in a loop network comprising: a plurality of ports serially connected in the loop network; means for bypassing the ports from the loop network; a control device with bypass control over at least one of the ports; and a host means for contacting the loop network; wherein the host means sends a command to the control device at regular intervals and the control device has a counter which restarts a time period at the receipt of each command, wherein, if the predetermined time period expires, the control device activates the means for bypassing all the ports under its control.

Preferably, the loop network has two loops and at least some of the ports are connected to both loops and wherein the control device bypasses the ports on both loops simultaneously. Preferably, there is one control device on or connected to each loop.

The time period may be at least two times the interval between commands.

The control device may also have a bypass means, but this is not activated by the timeout of the predetermined time period. If the control device is bypassed, the loop cannot be controlled and it will then be permanently bypassed.

The host means may instruct the un-bypassing of the means for bypassing selected ports to ascertain the location of the faulty port.

The loop network may be a Fibre Channel Arbitrated Loop pair with at least one enclosure, the control device being an enclosure services device in an enclosure. The control device may be a SCSI Enclosure Services device and may receive commands from the host means in the form of a host bus adapter. The ports may be disk drives.

The SCSI Enclosure Services device may be connected in the loop network. Alternatively, the SCSI Enclosure Services device may be connected via an Enclosure Services Interface capable port in the loop network.

According to a third aspect of the present invention there is provided a computer program product stored on a computer readable storage medium, comprising computer readable program code means for recovery from faults in a loop network, the loop network having a plurality of ports and a control device with bypass control over at least one of the ports, the program code means performing the steps of: sending commands at regular intervals to the control device; restarting a time period in the control device at the receipt of a command; and if the time period expires in the control device, instructing the bypass of all ports under control of the control device. The control device itself is not bypassed by the expiry of the time period.

This invention particularly, but not exclusively, addresses the case when both loops in a Fibre Channel Arbitrated Loop (FC-AL) pair have stopped functioning possibly due to a defective dual port device (e.g. a disk drive). Disk drives tend to be designed with both ports implemented in a single interface chip, thus failure of this chip can affect both loops. There is normally an automatic bypass facility implemented to enable the device (the disk drive) to bypass itself out of the loops if it detects that there is a problem with its interface to the loops, but this is not effective for all failure modes so the device can cause the failure of both loops.

This invention also proposes a method and apparatus by which the SCSI Enclosure Services (SES) controllers, or any enclosure services controller, in an enclosure could provide assistance in an automatic recovery procedure, rather than rely on manual intervention.

BRIEF DESCRIPTION OF THE DRAWINGS

Embodiments of the invention are now described, by means of example only, with reference to the accompanying drawings in which.

DESCRIPTION OF THE PREFERRED EMBODIMENTS

A loop network system with a plurality of serially connected ports in the form of a Fibre Channel Arbitrated Loop (FC-AL) is described for connecting together computer peripherals, in particular disk drives. This described embodiment is given in the context of FC-AL architecture although the described method and apparatus could be applied to any unidirectional loop network.

Figure 1:
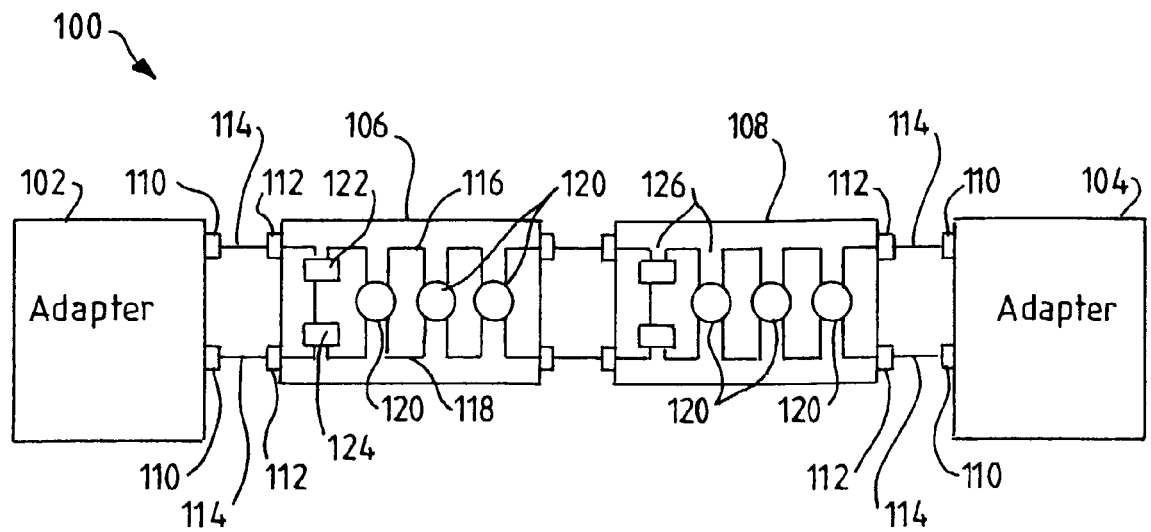
FIG. 1 is a diagram of a dual loop network in accordance with the present invention.

Referring to FIG. 1, a loop network 100 is shown in the form of a Fibre Channel Arbitrated Loop with two host bus adapters 102, 104. The loop network 100 in the shown embodiment has two enclosures 106, 108. Each enclosure in this embodiment has three disk drives 120 although in practice there are usually 10 or more disk drives in an enclosure. Dual loops 116, 118 each connect the components in the loop network 100. A first loop 116 is shown along the top of the loop network 100 in the diagram and a second loop 118 is shown along the bottom of the loop network 100 in the diagram.

The adapters 102, 104 have external connectors 110 for cables 114 connecting each loop 114, 116 from the adapters 102, 104 to external connectors 112 of the enclosures 106, 108. Cables 114 also connect the two enclosures 106, 108 such that each loop 116, 118 passes from one enclosure 106 to the next enclosure 108.

Each loop 116, 118 passes from the first adapter 102 via an adapter external connector 110, a cable 114 and an enclosure external connector 112 to the first enclosure 106. In the first enclosure 106 each loop 116, 118 passes through its own SES (SCSI Enclosure Services) device or controller 122, 124 and then through each of the disk drives 120 in turn. The two loops 116, 118 both pass through the same shared disk drives 120. Each loop 116, 118 then leaves the first enclosure via an enclosure external connector 112 and passes through a cable 114 to a second enclosure 108 which it enters via an enclosure external connector 112. The second enclosure 108 has the same set of components as the first enclosure 106. Each loop 116, 118, after passing through the second enclosure 108 is connected to the second adapter 104 via enclosure external connectors 112, cables 114 and adapter external connectors 110.

In each enclosure 106, 108, a loop 116 enters from an external connector 112 and is routed through each of the disk drives 120 and an SES device 122, 124. Each disk drive 120 or SES device 122, 124 has a bypass circuit to enable it to be bypassed by the loop, if required. The disk drives 120 are examples of dual port devices in that they are common to both the loops 116, 118 of the loop network 100.

An SES device 122, 124 is provided on each loop 116, 118 in each enclosure and the two SES devices 122, 124 are connected together through the enclosure's backplane. One SES device can be used to control the other SES device. An SES device manages an enclosure and provides a point of control for each enclosure. It can monitor parameters such as power and cooling and obtain information as to which slots for disk drives are occupied. It accepts a limited set of SCSI commands. SES devices can be used to instruct a bypass of a disk drive and to check which disk drives are bypassed.

The SES devices 122, 124 shown in FIG. 1 are provided as nodes in the loops 116, 118. These are referred to as "in loop" SES devices.

SES devices can also be provided by means of an Enclosure Services Interface (ESI) in which case the SES devices are not in the loop but are interfaced from one or more disk drives. SES devices of this nature are usually provided on a few disk drives in each enclosure. Commands can be sent to the SES device in an enclosure via the disk drive with the ESI.

In the embodiment shown in FIG. 1, a dual loop network 100 is shown by way of example, with two enclosures 106, 108 each with three disk drives 120 and two SES controllers 122, 124, one for each loop. Typical loop networks may have one or two host bus adapters and a set of six or so disk drive enclosures each of which may typically contain a set of ten to sixteen disk drives.

Figure 2:
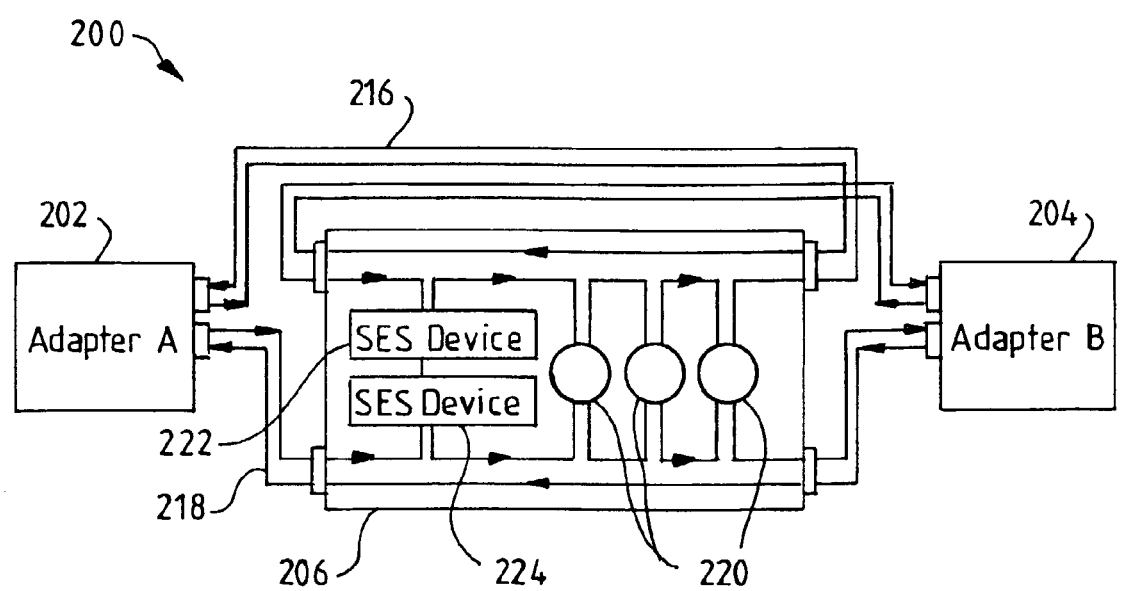
FIG. 2 is a diagram of a dual loop network in accordance with the present invention.

Referring to FIG. 2, a loop network 200 is shown with the path of two loops 216, 218 through a single enclosure 206 between two adapters 202, 204 in a loop network 200. On the top loop 216, a fibre channel signal leaving the first adapter 202 will first reach the second adaptor 204 and then the enclosure devices, in the form of an SES device 222 and the disk drives 220. On the bottom loop 218, a fibre channel signal leaving the first adapter 202 will first reach the enclosure devices in the form of an SES device 224 and the disk drives 220 and then will reach the second adapter 204. In this way the two loops 216, 218 travel through the enclosure devices in the same order.

Figure 3:
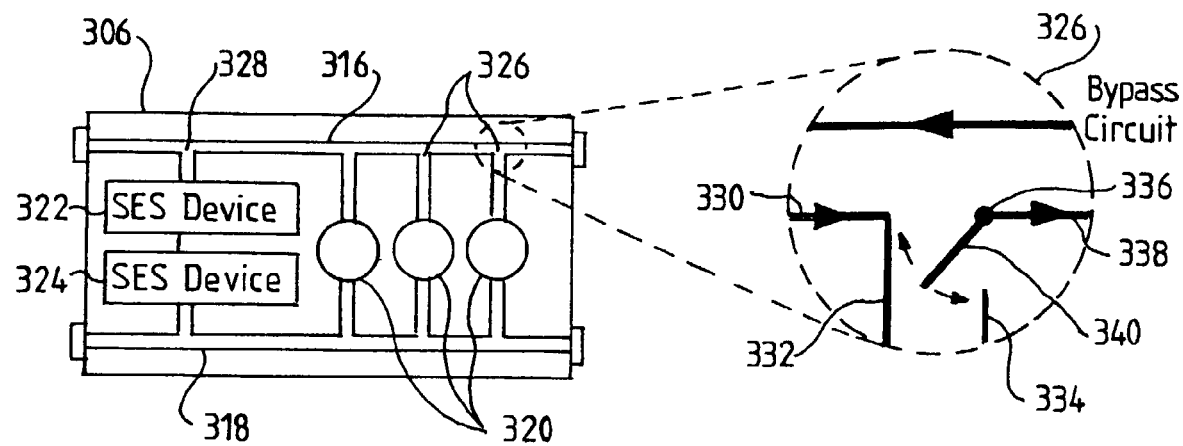
FIG. 3 is a diagram of a dual loop network with an enlarged view of a bypass circuit for a disk drive in the network.

Referring to FIG. 3, the bypass circuits provided in an enclosure are shown in more detail. An enclosure 306 is shown of the same form as the enclosure 206 of FIG. 2. The enclosure 306 may be one of several connected together in a loop network. The enclosure 306 has two loops 316, 318 each of which pass through common disk drives 320. A bypass circuit 326 is provided for each disk drive 320 on each loop 316, 318. Bypass circuits 328 are also provided for the SES devices 322, 324 on each loop 316, 318.

The inset of FIG. 3 shows a schematic diagram of the effect of a bypass circuit 326 in the first loop 316 in more detail. The loop has a path 330 travelling from left to right which is routed off along a path 332 at right angles to travel to a disk drive 320. The loop 316 returns from the disk drive 320 along a return path 334 parallel to the path 332 to the disk drive 320. The return path 334 meets a junction 336 and turns a right angle to continue the left to right path 338 of the loop 316 towards the next disk drive 320. The junction 336 in effect has a switch 340 which can join the left to right paths 330, 338 to bypass the disk drive 320.

Figure 4:
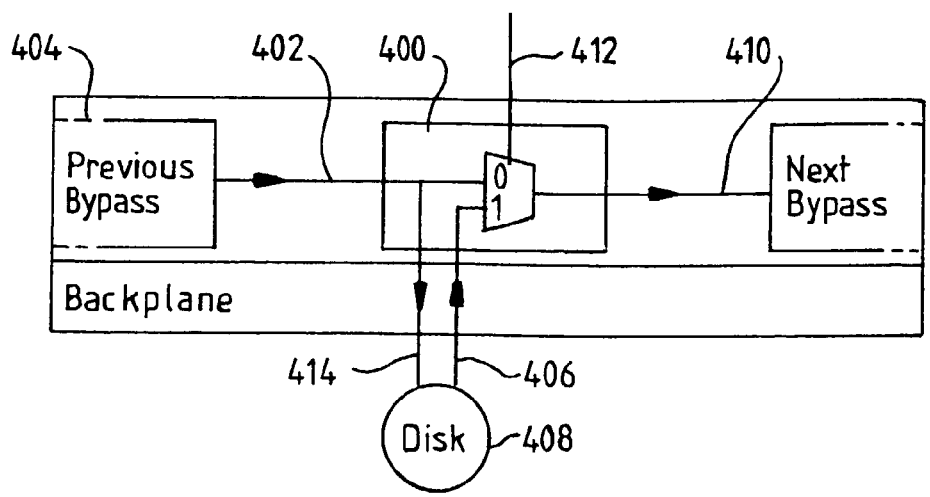
FIG. 4 is a diagram of a bypass circuit for a disk drive.

Referring to FIG. 4, a bypass circuit 400 is shown. The bypass circuit 400 has an incoming fibre channel signal 402 from the previous disk drive bypass circuit 404 in the loop. The bypass circuit 400 also takes in a fibre channel signal 406 (referred to as the drive out signal) from the disk drive 408 for which the bypass circuit 400 operates. These two fibre channel signals 402, 406 are the input signals to the bypass circuit 400. The bypass circuit 400 selects which one of the incoming fibre channel signal 402 and the drive out signal 406 will be routed to the fibre channel outgoing signal 410 from the bypass circuit 400.

The selection of the input signals 402, 406 is controlled by a port bypass control signal 412. The disk drive 408 is bypassed by the incoming fibre channel signal 402 being routed to the outgoing signal 410 if the port bypass control signal is "0".

The port bypass control signal 412 will send a signal to bypass the disk drive 408 in the following situations:

1. The disk drive 408 is requesting a bypass. This happens when a disk drive has performed an internal initialisation, it detects a failure mode, or it receives a primitive sequence instructing a bypass. If the disk drive itself is not present, the enclosure will assert a signal for the disk drive to be bypassed.
2. The SES device 322 for the loop 316 containing the bypass circuit 400 wants to bypass the disk drive 408. This can be controlled by sending SES commands to the SES device 322.
3. The other SES device 324 in the enclosure for the dual loop 318 wants all the devices on the first loop 316 containing the disk drive 408 to be bypassed. A signal is asserted by the other SES device 324 on the second loop 318 when a command has been received instructing it to bypass all devices on the first loop 316.

The port bypass control signal 412 will not bypass the disk drive 408 and will route the incoming drive out signal 406 to the outgoing signal 410 if the port bypass control signal is "1".

The port bypass control signal 412 will send a signal not to bypass the disk drive 408 in the following situations:

1. The disk drive 408 is not requesting a bypass.
2. The SES device 322 for the loop 316 containing the bypass circuit 400 does not want to bypass the disk drive 408. This can be controlled by sending SES commands to the SES device 322.
3. The other SES device 324 in the enclosure for the dual loop 318 does not want all the devices on first loop 316 bypassed.

A logical AND is taken of the three inputs to form the port bypass signal 412 which means that if anything wants the disk drive 408 to by bypassed, it will be bypassed.

The incoming fibre channel signal 402 will always be transmitted 414 to the disk drive 408 but the disk drive output signal 406 is only selectively transmitted onwards along the loop. When a disk drive is bypassed it continues to receive the inbound signal but the outbound signal is disconnected. When the disk drive is bypassed by SES control, the disk drive does not know that it is bypassed and behaves as normal.

When a disk drive is un-bypassed, it rejoins the loop. The behaviour of the disk drive will depend on whether the disk drive has an address in the loop, if it does it will rejoin the look without disturbance. If the disk drive does not have an address, it will appear that the disk drive has logged out and the loop will not recognise the disk drive until the next network reconfiguration.

The enclosures in the loop networks described support a 'set timeout' command. A command is sent by an adapter at regular intervals to a processor in an enclosure, for example to an SES device. If another set timeout command is not received on either loop in the enclosure before the time expires then the enclosure will bypass all disk drives on both loops. Only the SES devices will remain in the loops. The adapter can then use the SES device in one of the loops to diagnose which disk drive is causing the problem. This disk drive can then be permanently bypassed and the error logged. The other devices can all be reattached to the loop.

In the situation in which the SES device is not in loop but is enabled via an ESI disk drive, the enclosure processor should bypass all the disk drives on both loops except for one ESI-capable disk drive on each loop, but not the same disk drive on the two loops. If there is only one disk drive with ESI capability, it should be connected to one loop only. If there are no disk drives with ESI capability, the enclosure processor should take no action.

The set timeout signal is of the order of seconds with a granularity of 50 ms. An interval of zero means no timeout.

A problem addressed by the described method and apparatus is when disk drives fail and cause both loops to break at once. A disk drive can bypass itself when it believes that it is failing. However, it may fail in such a way that it fails to bypass itself and breaks both loops to which it is attached. If this happens then access to all devices (disk drives and SES devices) in both loops will be lost. If this problem is not quickly rectified then I/Os will be failed to a host. Also, if both loops are broken, there is no way to control the enclosures and the bypass circuits, and thus no way to repair the loop.

Figure 5A:
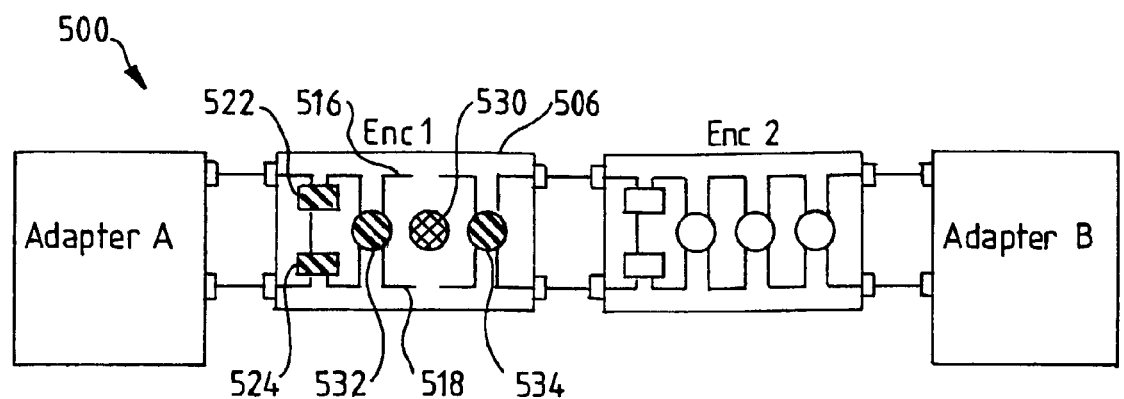
FIG. 5A is a diagram of the dual loop network of FIG. 1 with a failing disk drive.

Referring to FIG. 5A, a loop network 500 is shown of the same form as the loop network 100 of FIG. 1 in a failed situation. A first enclosure 506 has a failing disk drive 530 which breaks both loops 516, 518. The other disk drives 532, 534 in the first enclosure 506 and any other devices on both loops are rendered inaccessible due to the breaks in the loops 516, 518. The two SES devices 522, 524 for the two loops 516, 518 in the first enclosure 506 are also inaccessible.

Figure 5B:
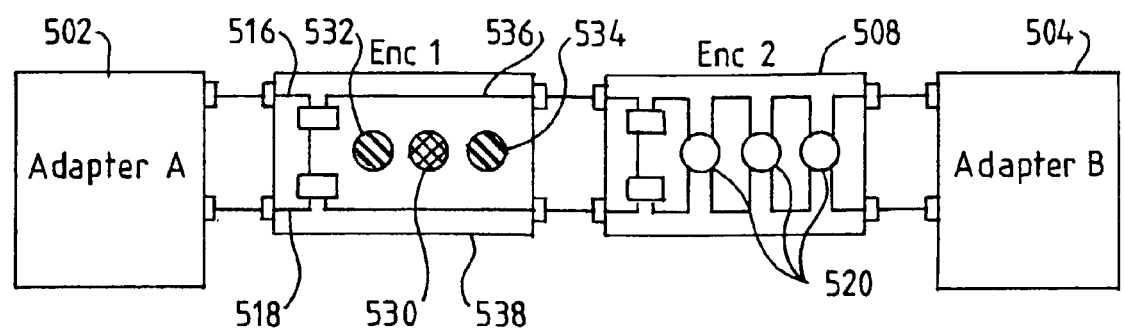
FIG. 5B is a diagram of the dual loop network of FIG. 1 with the disk drives of one enclosure bypassed in accordance with the present invention.

Due to the fact that the SES devices 522, 524 are inaccessible the timeout commands from the adapter cannot be received and the SES devices 522, 524 will bypass all the disk drives 530, 532, 534 in the first enclosure 506 thereby creating complete loops bypassing all the disk drives. This is shown in FIG. 5B with bypassed loops 536, 538. The second enclosure 508 may also timeout since as soon as the loops are broken it too will cease to receive timeout commands. When the loops are restored, the faulty device may be in any of the enclosures 506, 508 which have timed out.

Once the disk drives 530, 532, 534 are bypassed, both loops 516, 518 will come back up into operation; however, all the disk drives 530, 532, 534 will be inaccessible. One of the adapters 502, 504 can then find out which disk drive 530, 532, 534 is at fault. A configuration manager can inform the adapter if an SES device 522, 524 is accessible via a certain loop and the adapter can instruct the SES device 522, 524 to un-bypass disk drives from the other loop to see which disk drive causes the loop to break. Once the faulty disk drive 530 has been found, it can be bypassed from the loops 516, 518 permanently, an error is logged and the other disk drives 532, 534 un-bypassed.

To find the faulty disk drive 530 as quickly as possible, a binary search can be performed. Half the disk drives in the enclosure 506 will be un-bypassed. If the loops go down then it one of these disk drives that is at fault. If the loops stay up then it is one of the other set of disk drives, and so on until the disk drive is identified.

The set timeout signal is now described in detail. The described method implements two counters each controlled by one of the SES devices. Timers could equally be used in place of counters.

The counters work in the following manner. At regular intervals a SES command (the set timeout command) is sent from an adapter or host system to each of the SES devices in the loops. This command, when received by a SES device, is used to set its counter. Which starts to count down over a predetermined timeout period to zero. The predetermined timeout period is determined by the value in the command.

The commands are sent at regular intervals. The intervals are less than the predetermined timeout period. When the next command is received, the counter is set back to the beginning of the timeout period and again starts counting down to zero. The commands should arrive at the regular intervals such that the counter does not reach zero. If, however, the commands do not reach the counters due to a break in the loop, the counter does not reset to the beginning of the predetermined timeout period, but continues counting down to zero.

The timeout period must be longer than one of the intervals, but can also be longer than two of the intervals at which the commands are sent. Depending on the relationship of the timeout period with the intervals, two or more commands can be missed in the time taken for the counter to count down to zero. Therefore, when one command is missed the counter continues to count down, but if the next command is then received, the counter is set back to the beginning of the timeout period without reaching zero. This allows for the invalid transmission of a command which is not due to an ongoing fault.

In the event of both loops being broken by a failing device, the commands are not able to be transmitted. As a result, both the counters in an enclosure, one on each loop, will fail to be set before they count down to zero. The result is that the SES devices enable the bypass functions on all the dual port devices on both loops. This then means that the only FC-AL devices in the enclosure that are still connected to the loop, one to each, are the SES devices themselves.

The following rules apply:
1. The 'set' value would be such that the loss of at least two 'set' commands would be tolerated before the 'counter' stepped to zero.
2. Both counters at zero—set all dual port devices to bypass.
3. One counter at zero and the other SES device card defective—set all dual port devices to bypass.

If the loops are populated with enclosures that support this function and the failed device is in such an enclosure, the result of the above is that the loops should reinitialise and the adapters will only be able to 'see' SES devices.

The adapter needs to recognise that both loops in a pair have been broken and have then been restored. A procedure is detailed below to recover access to all the bypassed devices except the failing one. If there are multiple adapters on the loops then only one of them (the master) should be designated to perform this procedure The master adapter performs the following recovery:
1. Inform the other adapter/s not to try using any devices on the loops.

2. Check if the SES device has detected 'both counters at zero', if so, then continue with step 3, if not, check next SES device.
3. Send a command to one enclosure (SES device) on one loop of the pair (loop 1) to disable all the bypass functions in that enclosure on the other loop of the pair (loop 2).
4. Check that the loop 2 initialised properly and all devices configured with no problem.
5. If NOT, send a command to enable all the bypass functions again and then disable them one at a time to find the defective device (the one that stops the loop from initialising). Leave the defective device bypassed and continue on.
6. If the loop 2 is initialised OK, then reset the 'both counters at zero' status in this enclosure and continue on doing the same process to each enclosure in turn until all the enclosures and devices are configured on loop 2.
7. Log an error to the system identifying any device found to be defective.
8. Disable the bypass functions in all the enclosure on the loop 1 to match those disabled on the loop 2 or repeat steps 3 to 7 with loop 1 and 2 swapped.
9. Inform the other adapters that they can resume operations.

An automatic bypassing function can be controlled (enabled, disabled), via an SES command. When a 'set' counter command is received the automatic bypass function can be 'enabled' and there will be a separate SES command to 'disable' the function. The disable function can simply set the timeout to '0'.

The SES devices also monitor the external connectors of the enclosure. When they detect that all the external connections are in bypass mode and there are no active cables connected, then the automatic bypass function should be disabled.

This approach to the problem, although having the disadvantage of an adapter having to issue commands at regular intervals to maintain the counters, does have the very real advantage of not requiring complex detection techniques within the enclosure to detect when both loops have failed.

The invention is described in term of using an SES device with the SES protocol. Any enclosure services controller device could be used in a similar manner. Similarly, reference is made to disk drives as examples of dual port devices. Any peripheral device, for example, an alternative form of storage device, could be substituted for a disk drive.

The method described herein is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

What is claimed is:

1. An apparatus for recovery from faults in a loop network comprising:
a plurality of ports serially connected in the loop network;
means for bypassing the ports from the loop network;
a control device with bypass control over at least one of the ports; and
a host means for contacting the loop network;
wherein the host means sends a command to the control device at regular intervals and the control device has a counter which restarts a time period at the receipt of each command,
wherein, if the time period expires, the control device activates the means for bypassing all the ports under its control, wherein the loop network is a Fibre Channel Arbitrated Loop pair with at least one enclosure, the control device being an enclosure services device in an enclosure.

2. An apparatus as claimed in claim 1, wherein the control device is a SCSI Enclosure Services device and receives commands from the host means in the form of a host bus adapter.

3. An apparatus as claimed in claim 2, wherein the SCSI Enclosure Services device is connected in the loop network.

4. An apparatus as claimed in claim 2, wherein the SCSI Enclosure Services device is connected via an Enclosure Services Interface capable port in the loop network.

5. A loop network comprising:
a plurality of ports serially connected in said loop network;
means for bypassing ports from said loop network;
a controller having bypass control over at least one of said ports, said controller comprising a counter means; and
a host coupled to said controller;
where said host sends a command to said controller at regular intervals and, in response to receiving one of said commands, said controller restarts a time period of said counter means,
where, if the time period expires without said counter means being reset, said controller activates said means for bypassing all of said ports under control of said means for bypassing, where said loop network comprises a Fibre Channel Arbitrated Loop pair comprising at least one enclosure, and where said controller comprises an enclosure services device of said at least one enclosure.

6. A loop network as in claim 5, where said controller comprises a SCSI Enclosure Services device, and receives commands from said host using a host bus adapter.

7. A loop network as in claim 6, where said SCSI Enclosure Services device is connected in said loop network.

8. A loop network as in claim 6, where said SCSI Enclosure Services device is connected via an Enclosure Services Interface capable port in said loop network.

* * * * *